United States Patent [19]

Sand et al.

[11] 4,081,131
[45] Mar. 28, 1978

[54] TRAY ACCEPTOR APPARATUS

[75] Inventors: Edward Charles Sand, Willoughby; Harold C. Lightner, Kirtland, both of Ohio

[73] Assignee: Ardac, Inc., Willoughby, Ohio

[21] Appl. No.: 674,578

[22] Filed: Apr. 7, 1976

[51] Int. Cl.$^2$ .............. G06K 13/00; G06K 7/08; G07F 1/06
[52] U.S. Cl. .............. 235/419; 194/4 R; 235/449
[58] Field of Search .............. 360/2, 90; 235/61.11 R, 235/61.11 D, 61.11 E, 61.7 B, 61.12 M, 61.11 K; 340/149 A, 149 R; 194/4 R, DIG. 14, 4 E, 4 F, 4 G

[56] References Cited

U.S. PATENT DOCUMENTS

| | | | |
|---|---|---|---|
| 2,950,799 | 8/1960 | Timms | 194/4 R |
| 3,097,347 | 7/1963 | Simjian | 194/4 R |
| 3,419,710 | 12/1968 | Mathews | 235/61.11 D |
| 3,602,697 | 8/1971 | Tanaka | 235/61.11 D |
| 3,706,860 | 12/1972 | Burbank | 340/149 A |
| 3,708,790 | 1/1973 | Novrigat | 235/61.12 M |
| 3,790,758 | 2/1974 | Tanigawa | 235/61.11 R |
| 3,885,132 | 5/1975 | Luoma | 235/61.11 R |
| 3,980,167 | 9/1976 | Tamura | 194/4 R |

Primary Examiner—Robert M. Kilgore
Attorney, Agent, or Firm—Oldham, Oldham, Hudak & Weber

[57] ABSTRACT

A tray acceptor apparatus contains a housing with a tray mounted on the housing. A top plate is mounted on the housing parallel to the tray and a bottom plate is also mounted in the housing parallel to the tray with the alignment of the top and bottom plates being very accurate. Additionally, a unique way or ball bearing tray guide is utilized so that the tray slides accurately with very little if any free play such as skew or pitch. The tray acceptor apparatus very readily accomodates magnetic sensing mechanisms due to the accurate alignment of the tray and the accomanying plates. The apparatus also includes a mechanical engagement of the tray to a timing shaft with either the tray or shaft having trip switches or the like so that a precise sequence of operation is obtained with every insertion of the tray into the housing. Moreover, a locking mechanism is employed during the valdiation of currency or checks and a pair of acceptance pressure rollers provides a secure frictional grip on the currency or check.

20 Claims, 10 Drawing Figures

TRAY ACCEPTOR APPARATUS

BACKGROUND OF THE INVENTION

The present invention relates to a tray acceptor apparatus wherein a sliding tray which is virtually free from skew and pitch motions is mounted in a housing in accurate relationship with a top plate and a bottom plate. More specifically, the present invention relates to a tray acceptor apparatus which readily incorporates magnetic detection systems or other devices which require accurate mounting for validation of currency, checks or notes. Additionally, the apparatus contains a mechanical driven timing shaft, an improved note acceptance pressure roller system and an improved tray slide system.

Heretofore, note validators have generally employed one tray in connection with a detection device, such as an infrared detector, usually mounted on a shaft. Often, it may be desirable to utilize a magnetic detection device in note validators to assure ready detection of counterfeit and fraudulent notes. Although the prior art detection apparatuses are suitable for detection device such as infrared, they generally cannot be utilized for magnetic sensing since they inherently have poor tolerances, poor alignment and the like. That is, the utilization of magnetic sensing requires an accurate alignment and registration of the note with the magnetic detection device, a wrinkle-free detection surface with proper pressure applied as well as other requirements.

SUMMARY OF THE INVENTION

It is, therefore, an object of the present invention to provide a tray acceptor apparatus which contains auxiliary plates in parallel alignment with a tray for accepting notes.

It is another object of the present invention to provide a tray acceptor apparatus, as above, wherein the tray slides smoothly with virtually no lateral or vertical play.

It is a further object of the present invention to provide a tray acceptor apparatus, as above, wherein the tray slides in ball bearing ways or guides.

It is yet another object of the present invention to provide a tray acceptor apparatus, as above, wherein a way or guide is spring loaded and causes the tray to bear against the other way which acts as a reference plane.

It is another object of the present invention to provide a tray acceptor apparatus, as above, wherein at least one way is an integral part of a tray acceptor apparatus side wall housing.

It is yet another object of the present invention to provide a tray acceptor apparatus, as above, wherein the ways have a contour such that the bearings force dirt and foreign material away from the way working surfaces.

It is yet another object of the present invention to provide a tray acceptor apparatus, as above, wherein, in lieu of spring loaded ways, spherical rollers and special sockets are fixed on one side plate and spring loaded spherical rollers are fixed on the other side plate.

It is yet another object of the present invention to provide a tray acceptor apparatus, as above, wherein a mechanical timing shaft is positively driven through linear motion of the tray via a shaft gear and a tray rack.

It is another object of the present invention to provide a tray acceptor apparatus, as above, wherein top accept rollers cammed from an auxiliary plate swing along an arc which causes the rollers to travel at relatively the same velocity and in nearly the same direction as the note when contact is made.

It is yet another object of the present invention to provide a tray acceptor apparatus, as above, wherein bottom accept drive rollers are fixed to another auxiliary plate, a tangent of the bottom accept rollers lie within the plane of the note and the top rollers are recessed so that upon engagement with the note, thereby good frictional contact is assured.

It is yet another object of the present invention to provide a tray acceptor apparatus, as above, wherein the axis of the top roller shaft is positioned slightly behind the bottom rollers so that rotation of the bottom rollers tends to pull the top rollers into a better contact load.

It is yet another object of the present invention to provide a tray acceptor apparatus, as above, wherein the top and bottom rollers may be press fitted on the shafts or keyed together.

It is yet another object of the present invention to provide a tray acceptor apparatus, as above, wherein a tray lock requires a small solenoid force.

It is another object of the present invention to provide a tray acceptor apparatus, as above, wherein the incorporation of magnetic detectors is readily achieved.

It is yet another object of the present invention to provide a tray acceptor apparatus, as above, wherein a resilient cam on the mechanical timing shaft accurately holds the note against a magnetic head in a wrinkle-free relationship.

It is yet another object of the present invention to provide a tray acceptor apparatus, as above, wherein two magnetic detectors are utilized, one to detect the presence of a magnetic field on the note and the other to detect the absence of a magnetic field on another portion of the note.

Yet another object of the present invention is to present a tray acceptor apparatus, as above, wherein at least one magnetic detector is utilized to sense physical shock impact to the system and to negate the effects of electrical noise signals imparted thereby.

It is yet another object of the present invention to provide all these features into a tray acceptor that may still use a conventional primary detection system.

These and other objects of the present invention, together with the advantages thereof, over existing prior art forms will become apparent from the following specification, are accomplished by the improvements hereinafter described and claimed.

In general, a tray acceptor apparatus comprises, a housing, a tray mounted on said housing, a top plate, said top plate mounted on said housing parallel to said tray, a bottom plate, and said bottom plate mounted on said housing parallel to said tray.

Other facets of the invention comprise the utilization of spring loaded ball bearing ways and other features which maintain the tray in exact alignment with respect to one side wall of the housing, and the incorporation of a primary and a secondary magnetic detection device.

DESCRIPTION OF THE PREFERRED EMBODIMENT

In general, a tray acceptor apparatus according to the present invention is generally indicated by the numeral 10. Housing 11 of the apparatus is preferably made of steel and resides within a vending machine structure, not shown. A tray, generally indicated by the numeral 15, slidably resides within the housing. Tray 15 is generally of a size corresponding to a note which is to be utilized in a particular transaction. Generally, the note may be monetary paper of any nation in the world, a check, a bank note, a stock certificate, or any other monetary or legal note, document, and the like which requires validation.

Figure 1:
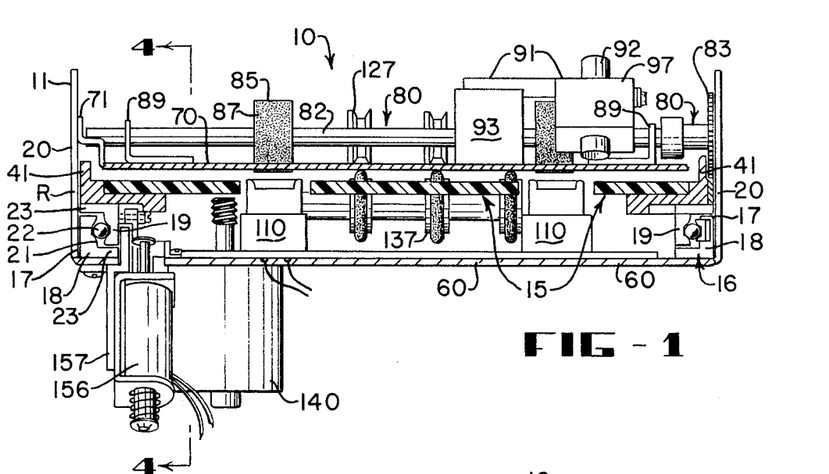
FIG. 1 is a partial sectional front view of a tray acceptor apparatus embodying the concepts of the present invention.

According to the present invention, tray 15 slides smoothly in and out of apparatus 10, and is, skew (yaw) free and pitch free, due to a tray mounting and sliding assembly generally indicated by the numeral 16. Through tray mounting assembly 16, tray 15 is accurately and precisely aligned in a particular plane, generally horizontal. As shown in FIG. 1, the tray mounting assembly of the present invention contains a pair of ways or tray guides 17. Desirably, at least one tray guide 17 contains a stationary way 18 which is usually connected to a side plate 20 and a movable way 19 which is connected to tray 15. Considering first side plates 20, they form an essential feature of housing 11 and may be attached to a vending machine, not shown. Side plates 20 are desirably made of metal and may be stamped, extruded, or formed in any other conventional manner. It is highly desirable that side plates 20 be completely flat or lie within a particular plane. One of the side plates 20 of housing 11 serves as a reference plane for tray 15 in that tray 15 is spring loaded or biased against the referenced side plate, indicated by the letter "R".

Figure 9:
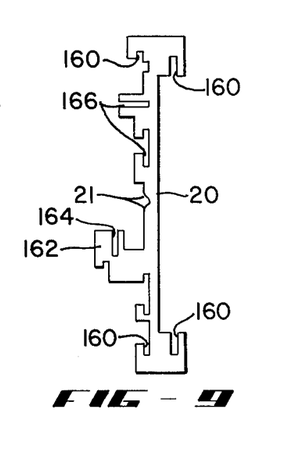
FIG. 9 is a side elevation of an alternative side plate containing a way recess thereon.

Referring to FIG. 9, an extruded side plate 20 is shown which contains various flanges and slots. Desirably, the side plate 20 may contain recess way 21 extruded on the side wall portion thereof. Of course, the recess may contain a surface identical to stationary way 18 and thus acts as a surface along which low friction sliding member 20 may move. Sliding member 20 also engages movable way 19 of tray guide 17. Since side plate 20 may be accurately aligned, tray guide 17 will be accurately mounted.

In addition to way recess 21, side plate 20 contains a plurality of slots, grooves, flanges and the like in order to locate various auxiliary plates and the like. For example, slots 160 engage the housing of an automatic coin dispensing apparatus or note validation machine (not shown). Flange 162 may engage bottom plate 60 through slots 164 and thus establish a very accurate and parallel alignment of bottom plate 62, tray 15. Additionally, slots 166 may receive and engage top plate 70 so that this plate is accurately aligned with tray 15 as well as bottom plate 60. Hence, it can be readily seen that through the provision of an extruded side plate 20 as shown in FIG. 9, a very accurate engagement of the various plates and trays can be readily achieved.

Figure 6:
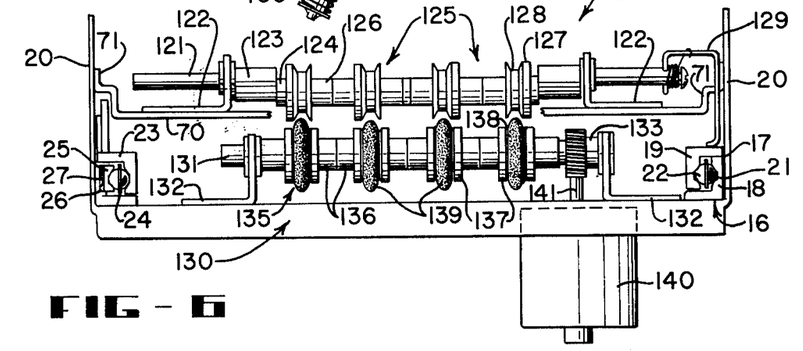
FIG. 6 is a rear elevation view of the tray acceptor apparatus.

Guides 17 may be constructed in any conventional manner as by extruding, casting, stamping or the like. However, according to the concepts of the present invention, a forming process is utilized which insures that accurate or straight linear ways are formed. As shown in FIG. 1, stationary way 18 and movable way 19 located on reference side "R" are identical although they may be dissimilar. Generally, the ways have a recess 21 for receiving a low friction sliding member 22 and have a flange 23. Preferably, the low friction sliding member 22 is a ball bearing or other readily slidable member which maintains alignment between the stationary way and the movable way. Desirably, a plurality of ball bearings are utilized between the ways and are maintained within a fixed relationship from one another through a guide 24 as shown in FIG. 6. More specifically, guide 24 may simple be a piece of metal having apertures therein for receiving a ball bearing. Way recess 21 may, of course, be shaped to have a contour similar to that of the ball bearing. However, preferably it has a contour such as a lotus shape which causes the ball bearings or low friction sliding members 22 to bear against the side of way recess 21 thereby permitting any foreign material or matter such as dirt to be forced away from the working surface of the way and ball bearings. Of couse, other specifically shaped surfaces may also preferably be utilized so long as they provide a clean working surface, that is, a working surface upon which dirt or foreign material is not forced.

Guides 17 may be attached to side plate 20 in any conventional manner such as by screws, clips, welding, or the like. Alternatively, and as shown in FIG. 1, stationary way 18 is connected to an auxiliary plate, generally indicated by the numeral 30. In the preferred embodiment shown in FIG. 1, side plates 20 are actually formed from auxiliary plate 30 by bending the ends thereof to reside in a vertical position. Connection of the stationary way to the auxiliary plate is preferably made through way flange 23. Connection of the movable way to slide tray 15 is preferably made through way flange 23 utilizing any conventional method, such as clips, welds, or, as shown, using threaded fasteners. Although identically shaped stationary and movable ways are shown in the preferred embodiment, other shapes may be utilized including a way which is an integral part of side plate 20 and formed thereon as by extruding.

In order to maintain an exact alignment with respect to referenced side plate "R", the way assembly located juxtaposition to the opposite side plate has a way rail 25 which is located in way seat 26. Positioned between way rail 25 and way seat 26 is a biasing means or a spring such as ribbon spring 27 which forces the movable way and hence entire tray assembly 15 into abutment against the stationary way of slide plate "R". Hence, lack of skewing motion of the tray is thus assured. Moreover, the existance of a way assembly made in accordance with the present invention as well as the spring loaded way seat or gib 26 assures a smooth sliding movement of tray 15 in a single plane.

Figure 7:
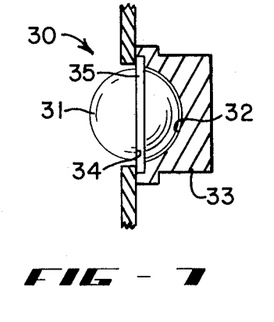
FIG. 7 discloses a ball and socket which may be utilized to contact and guide the tray.
Figure 8:
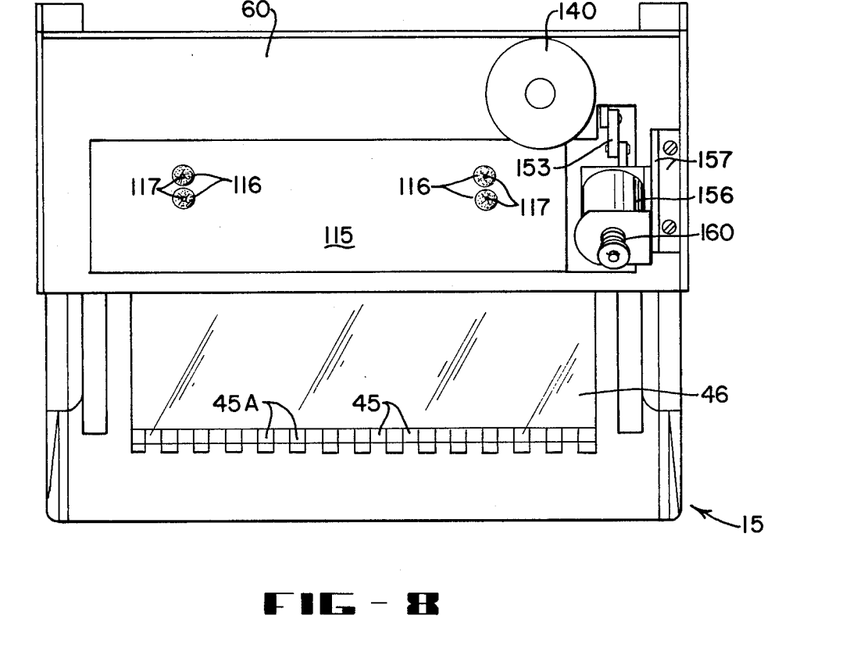
FIG. 8 is a bottom plan view of the apparatus.

In lieu of stationary way 18 and a low frictional sliding member 22, a roller assembly generally indicated by the numeral 30 may be utilized which is usually affixed to side plate 20. As best shown in FIG. 7, roller assembly 30 has a roller 31 such as preferably a metal ball which resides in a roller assembly recess 32 of roller housing 33. The ball may be a ball bearing having an aperture 34 for receiving shaft 35 and the housing may be attached to side plate 20 in any conventional manner such as a threaded fastener, a weld, a clip or the like. Desirably, at least roller assemblies 30 located on the plate opposite reference plate "R" is spring loaded to prevent skewing. Of course, roller 31 has a shape which matingly engages way recess 21. Additionally, should way recess have a shape other than that shown in FIGS. 1 and 6, it desirably has a contour which causes rollers 31 to force dirt and foreign material away from any work surfaces of the way. To insure durable operation, roller assembly 30 may be made out of metal such as steel or a sturdy plastic material such as nylon.

Figure 2:
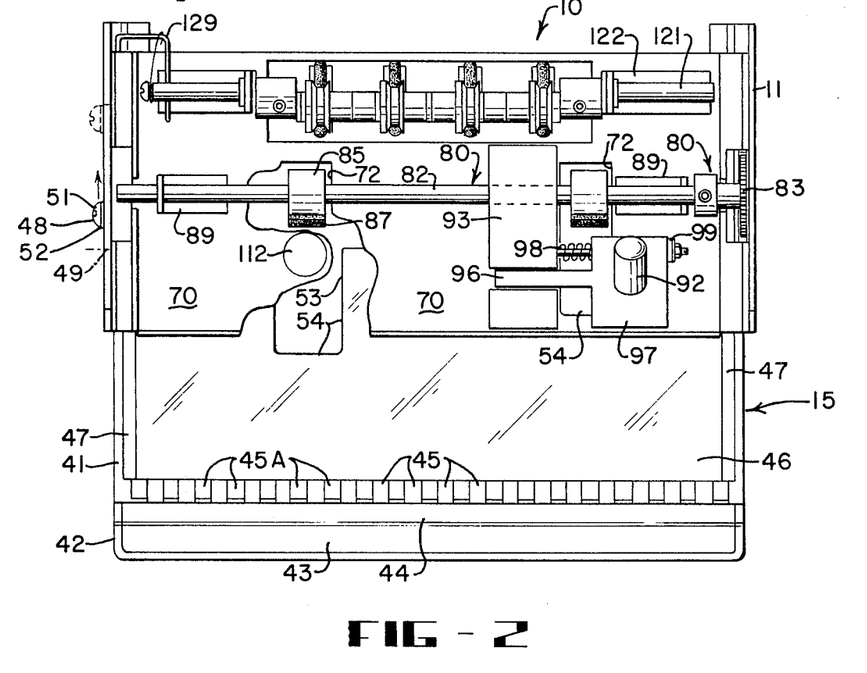
FIG. 2 is a top plan view of the apparatus.

Tray 15, which is affixed to the movable way, may be any conventional tray. For example, tray 15 may have side beams 41 which are connected to the way flange 23 and serve as a wall to maintain a note. A front or push bar portion 42 is designed to accommodate a person's fingers in that it has a horizontally inclined or rest surface 43 and a vertically inclined or push surface 44. Top surface 45 of the tray push bar exists at an elevation above the push surface so that upon closure of tray 15 into a housing slot of the tray acceptor apparatus (not shown), a very narrow gap is left. Preferably, the gap is so small that a metal coat hanger or other fine wire cannot be inserted through it and thus prevents fraudulent removal of the note. Additionally, top surface 45 has bosses 45A which matingly engage escutcheon recesses (not shown) of the tray acceptor apparatus housing and further prevents tampering with the note during validation. Tray note support 46 may be made of metal or desirably plastic and may have imprinted thereupon the replica of a note such as a U.S. One Dollar Federal Reserve Note. As seen in FIG. 2, the tray support is attached to a generally horizontal inwardly extending beam flange 47 by any conventional fastening means such as threaded fasteners. Since note support 46 extends across the entire width of tray 15, it can be removed and another note support inserted which will accommodate a smaller size note by having side walls which extend further inward. Alternatively, a tray of the different width may be utilized with side plates 20 being a corresponding shorter or larger distance apart.

In order that the note is inserted a proper distance into apparatus 10, one of the tray side beams 41 may have a lateral extending tab 58 which engages a slot 49 in a corresponding side plate. As shown in FIG. 2, tab 48 in the embodiment shown consists of a screw 51 having a bushing 52 thereon. The other tray side beam 41 may have downwardly extending tab (not shown) which engages housing 11, side plate 20 or stationary way 18 at the same closure distance as bushing 52. Thus, the inward and outward extent of side beam 41 and hence the movable ways 19 are limited by the extent of slot 49.

Tray note support 46 generally extends inwardly into housing 11 a sufficient distance to support the note. However, note support 46, as shown in FIG. 2, may have projections 53 or recesses 54 to facilitate various validation operations. For example, if a direct contact between the note and a validation device such as an infrared detector is desirable, a portion of note support 46 in the vicinity of the device contains a recess 54 to enhance the operation of the validating device.

It is another important aspect of the present invention to utilize at least one auxiliary plate or tray which is attached in such a manner that it is parallel to note tray 15. As previously mentioned, an auxiliary plate such as bottom plate 60 may exist in parallel alignment with tray 15 through a conventional connection with way flanges 23 of stationary ways 18. However, should way assembly 16 be connected directly to side plates 20, bottom tray 60 may be secured directly to side plates 20 in a very accurate alignment in any conventional manner such as screws or the like. A yet further method or mode of attachment involves the utilization of bosses (not shown) which are accurately aligned to side plates 20. Bottom tray 60 may then be secured to the bosses in any conventional manner. The important aspect is that regardless of method or mode of attachment, bottom plate 60 lies within a plane parallel to note tray 15. As shown in FIG. 6, bottom plate 6 has a flange 61 to add rigidity to the plate.

Another auxiliary tray or top plate 70 may also exist as shown in FIGS. 1 and 2. Similarly, the mode or method of attachment may vary in that flanges 71 may be attached directly to the side plates, or to bosses (not shown) which in turn are attached to side plate 20. Of course, any conventional fastener may be utilized such as threaded screws, a weld, or the like with a preferred connection being one which affords an accurate alignment.

Thus in the preferred embodiments shown, top and bottom plates 60 and 70 exists in planes parallel to note tray 15. This feature of parallel plates with respect to the tray surface allows various validation devices to be mounted and/or engage the note at a perpendicular angle and thus facilitate good reliable readings. Another improved aspect is that reliable magnetic sensing devices which are very sensitive and require an accurately aligned tray without any looseness either in the skew or pitch direction can readily be utilized.

In addition to various note detecting devices, various other items may be connected to bottom and top plate 60 and 70 such as a drive roller, a pair of accept rollers, a solenoid tray lock device and the like.

Figure 3:
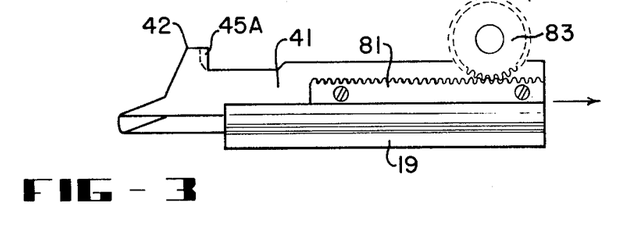
FIG. 3 is a side elevation view showing the tray, the tray guide, and a timing shaft gear engaging the tray rack.
Figure 4:
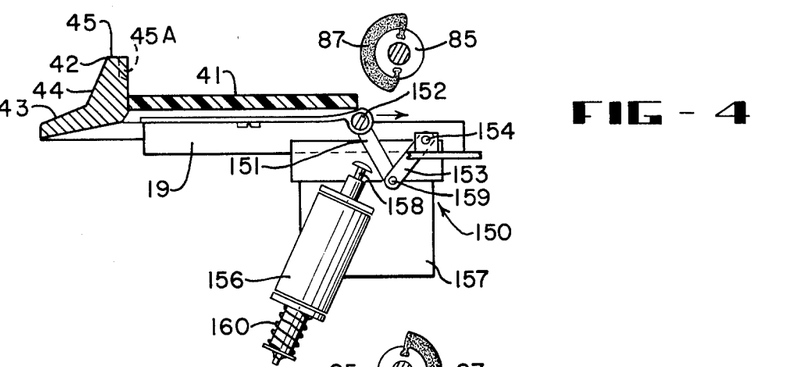
FIG. 4 is a partial sectional side elevation view showing the normal relationship of the tray to a solenoid.

One of the items which may be attached to top plate 70 is a synchronized mechanical drive system generally indicated by the numeral 80. Drive system 80 is directly geared to tray 15 through a positive mechanical engagement so that any movement of the tray results a corresponding movement of the drive system. This feature is accomplished through a rack 81 which is mounted on tray side beam 41 in any conventional manner such as through the utilization of screws as shown in FIG. 3. Shaft 82 of the drive system has a gear 83 mounted on one end thereof and attached in a conventional manner such as through a keyway or a screw bearing against the shaft. The teeth of gear 83 matingly engage the teeth of rack 81 so that upon any movement of tray 15, the linear motion of the tray is converted to a rotational motion of drive shaft 82. Thus, the device is mounted on or operated by drive shaft 82 will be driven in a fixed relationship and velocity relative to the tray.

One such device is compliant rollers 85 which engages the note and preferably drive it at the same speed as that of the tray. Rollers 85, which may be made of metal or preferably plastic such as nylon may be attached to drive shaft 82 as through screws. Mounted on at least a portion of drive rollers 85 is a resilient frictional bearing device such as a strip of foamed rubber 87 such as neoprene, urethane, etc., the ends of which may be secured to the roller through recesses 88. In order to assure a good frictional contact, the height of foam rubber strips 87 is usually slightly greater than distance between drive rollers 85 and the surface of tray 15 or the note. Of course, to enable contact of the foam portion of the drive rollers with the note, apertures 72 exist within top plate 70. In order that the contact surface of foam rubber portion 87 rotates at the same speed as said linear motion of the note surface, any number of gearing arrangements may be utilized. In a preferred embodiment, the effective contact portion of the teeth or rack 81 is located in the same plane as the note surface which for all practical purposes is also the plane of tray note support 46. Thus, the radius of drive shaft gear 83 is identical to the radius of the contact portion of foam rubber 87 on drive rollers 85 to the center of drive shaft 82. Hence, as shown in FIG. 1, drive shaft 82 is simply mounted on top plate 70 through bracket supports 89 at a distance which permits engagement of drive shaft gear 82 with rack 81.

In the validation of a note, various time sequential operations must be performed in relationship with respect to one another such as the tripping of a detection device switch, a scanning device switch, a tray locking switch and the like. According to the present invention, such switches may be tripped through cams or levers which are mounted either on tray 15 as through side beam 41 or directly to drive shaft 82 since it is synchronized with the linear motion of tray 15. Thus, cumbersome or undesirable mechanical features usually mounted to the tray may be eliminated and attached to the drive shaft to trip various switches in a fixed relationship to one another with respect to an exact location of the tray.

Drive shaft 82 may also operate a conventional optical scanning device 91 as shown in FIGS. 1 and 2. Generally, these devices conduct a validation operation on the note by counting lines and spaces between lines on a portion of the note in conjunction with a reticle 92. The optical scanning device is driven laterally across a specific portion of the note at a precise location on the note through a gearing and camming arrangement contained in scanning device housing 93. Specifically, a housing drive bar (not shown) which contains teeth on the lower portion thereof is driven by a gear mounted on drive shaft 82. The upper portion of the drive bar contains a cam thereon which engages a tab (not shown) extending from a reticle housing. The cam causes reticle housing to move in a lateral direction and then releases the tab whereupon spring 98 drives the reticle across the desired portion of the note. Of course, as apparent to one skilled in the art, numerous conventional scanning or detecting devices including infrared sensitive devices may be utilized and driven off of drive shaft 82 in any number of methods.

The present invention, as noted, is particularly suited for use of magnetic sensing systems or devices which require very high tolerances in maintaining both registration and pressure contact with a note. Smooth operating and accurately mounted tray 15 along with mechanical drive system 80 provides the important proper registration. Magnetic sensing devices operate upon the principle that a large number of inks utilized in the printing of notes such as monetary currency, checks, credit cards and the like, contain iron which can be magnetized. The magnetic sensor operates upon the principle that it counts a sufficient number of magnetized lines so that a minimum flux condition is determined.

The present invention utilizes a two-channel system or a system containing two magnetic sensing devices generally indicated by the numeral 110. These devices may be of a conventional design or manufacture having a normal head or a flux responsive head such as a "hall effect" head. Such heads count discontinuities in the magnetic field as the document moves thereover. Thus, the "hall effect" head does not work as a static reading device and therefore magnetic sensing devices 110 may be utilized in high direct current fields. Normal flux heads or derivative heads may be utilized in conjunction with a high pass filter or overload amplifier which rejects 60 and 180 cycles of frequency.

A first magnetic sensing device is located on bottom plate 60 so as to detect the presence of actual magnetic lines on the note. Preferably, compliant roller 85 is located on top plate 70 juxtaposition to the head of the sensing device. Since roller 85 is synchronized with the tray location, a very good reading will be obtained since the foam rubber portion of the roller will press the note into contact with the magnetic sensing head and achieve an excellent contact. Moreover, the compliant roller will insure that no wrinkles or overlapping or crowded magnetic lines will occur as the note passes across the face of the magnetic sensing device head. Of course, the first magnetic sensing device may be tripped on and off by an appropriately mounted switch located on either tray 15 or drive shaft 82 of the synchronized mechanical drive system 80. When a sufficient number of lines or minimum flux has been determined as based upon a ratio of the system signal to the noise ratio for the frequency as represented by pulses caused by the discontinuous field of the document, a signal is sent to a logic system. Although as shown in the drawings the back side of the note is scanned, the reverse may be true depending upon the location of the magnetizable ink. Additionally, a permanent magnet 112 or other similar device is utilized in association with each magnetic sensing device 110 to magnetize the ink and may be attached to top plate 70 as shown in FIG. 2.

Another or a second magnetic head sensing device in the two-channel system is located in an area below the note where there are no magnetic lines. That is, although printed lines or the absence of such lines may exist in the area, such lines are non-magnetic. The second sensing device may be similar or identical to the first and similarly located, that is, on bottom plate 60 with the face of the device located on the bottom surface of the note as it passes by. Similarly, another compliant roller 85 is located in drive shaft 82 above the second magnetic head so that the foam rubber 87 will press the note into a firm abutment with the magnetic head. During the validation of a genuine or authentic note, the second magnetic sensing head determines the absence of any magnetic lines and accordingly signals the logic system. The logic system is programmed in any conventional manner to accept the note in such a situation. However, should a fraudulent note be utilized such as a highly accurate photocopy, such a photocopy inherently containing magnetic ink, the second magnetic sensing device will send a different signal to the logic system which will then reject the phony note. The specifics of the requisite sensing circuitry will be set forth hereinafter.

In order that the highly sensitive magnetic sensing devices work properly in addition to the provision of a flat portion of the note passing over the face of the magnetic heads, it is important that the magnetic heads themselves be exactly located. This may be accomplished by mounting a printed circuit board 115 to bottom plate 60. The boards contain a large flat washer 116 in the vicinity of the desired location of pins or sockets 117 which extend from the bottom of the magnetic housing devices 110. Then, the magnetic head is accurately aligned and the pins or sockets are soldered to flat washer 116. Of course, other methods of achieving an accurate alignment may be utilized as, for example, accurately locating and drilling holes in the bottom plate and fastening the bottom of the magnetic sensing head thereto.

In lieu of a two channel or magnetic head system which senses two different areas of the note through two different timing windows or apertures in top plate 70, a single magnetic head may be utilized which through appropriate camming and timing switches is designed to operate or detect magnetic lines through a single window or aperture but at different points in time as tray 15 is pushed in and thus sends signals as to a logic system as to the presence or absence of magnetic ink on different aligned portions of the note. That is, during the first sensing time period, magnetic ink may be detected whereas during the second timing period, the head should sense the absence of magnetic ink. Appropriate signals are thus sent to the logic system and the note either accepted or rejected depending upon the signals. Thus, it can be seen that through the accurate alignment of tray 15, the accurate alignment of magnetic sensing heads 110 and through the provision of a synchronized mechanical drive system whereby a specific portion of the note is pushed across the face of the sensor by a compliant roller, the utilization of the generally highly sensitive detection devices is readily achieved. Of course, instead of magnetic sensing heads, tray acceptor apparatus 10 may employ any other conventional validation devices such as optical sensing detectors, infrared detectors, and the like. As should be apparent, the structure of the present apparatus allows precise location and scanning time periods with respect to various portions as tray 15 is pushed inwardly into housing 11. Moreover, one or a plurality of such devices, whether of the same or different type may be utilized in any combination as apparent to those skilled in the art.

In the utilization of magnetic sensing devices, if the tray is rapidly pushed into the apparatus as when it is "slammed closed" the shock produced may cause an inaccurate reading in one of the timing windows as in the utilization of a single magnetic head with two windows. This situation can be readily rectified by the incorporation of an inductance capacitor network or similar device which readily detects shock and will emit a signal to the logic system to reject the note. Thus, the apparatus cannot be "fooled" by utilizing a phony note and slamming the tray shut.

Figure 10:
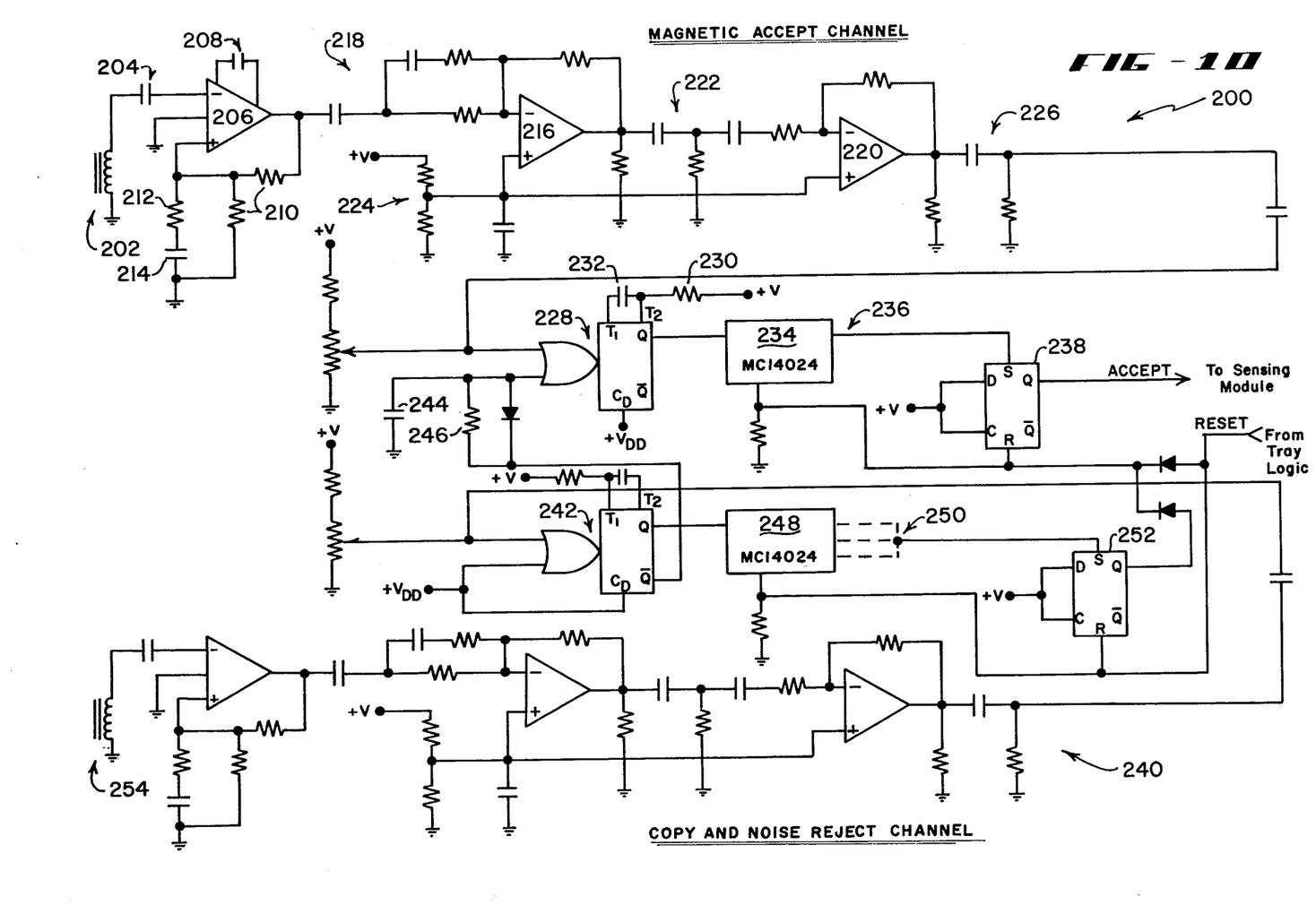
FIG. 10 is a schematic diagram of the validity detection circuitry of the invention.

With reference now to FIG. 10, the validity sensing and determination circuitry may be seen as designated generally by the numeral 200. A magnetic read head 202 is positioned, as discussed hereinabove, juxtaposition to a compliant roller 85 located on the top plate 70. This head 202 is so aligned as to detect the presence of magnetic lines on a valid piece of currency or other security. Such heads are well known to those skilled in the art and, in the instant embodiment, produce low voltage output signals of a frequency characteristic of the discontinuities of the magnetic lines sensed. The low voltage output signal is coupled through a capacitor 204 to a pre-amplifier 206. High frequency roll off is provided by capacitor 208, DC gain is set by the resistor network 210, and AC gain and 60HZ filtering is controlled by resistor 212 and capacitor 214. The amplified output of the pre-amplifier 206 is coupled to the amplifier 216 through a resistor-capacitor network 218 again provided for purposes of attenuation of 60HZ noise. The output of the amplifier 216 is coupled to the amplifier 220 through a noise filtering network 222 such that the output of the amplifier 220 is of sufficient amplitude to appropriately manipulate the logic circuitry to be discussed hereinbelow.

It should be noted that the positive inputs of the amplifiers 216, 220 are connected to a biasing circuit 224 which is interposed solely for the purpose of allowing the amplifiers 216, 220 to be operated from a single power supply. Of course, as is known to those skilled in the art, such biasing might be readily alleviated if positive and negative supplies were used in the normal fashion.

There is thus presented at the output of the amplifier 220 a substantially noise-free voltage signal of a frequency determined by the pulse frequency read by the magnetic head 202 and of an amplitude determined by the selected gains of the amplifiers 206, 216, 220. This signal is coupled through a noise filter 226 to an input of the one shot 228. In the absence of signals supplied from the copy and noise reject channel to be discussed hereinafter, there is emitted from the one shot 228 a signal of fixed amplitude and time duration upon each positive going output signal from the amplifier 220. Thus, the output of one shot 228 is a square wave function having a number of pulses equivalent to the number of magnetic discontinuities experienced by the read head 202 during the sensing cycle. Of course, as is known to those skilled in the art, the time duration of the output pulse of the one shot 228 is determined by proper selection of the resistor 230 and capacitor 232. These pulses are then applied to a binary counter 234 which is decoded at the output 236 to emit a signal when a sufficient number of magnetic discontinuities have been sensed by the head 202 to indicate validity of the bill. This signal sets the latch 238 and emits a signal to the sensing module indicating that the currency or security is valid and that the requisite change can be dispensed. Such dispensing is previously known in the art and is not elaborated upon herein.

As was mentioned hereinabove, photo copies of valid currency or securities may be made which are capable of passing many validation tests. Further, by slamming the tray 15 into its read position, electrical noise may be introduced which results in signals at the read head or within the counting circuitry which would be indicative of a valid security. To overcome these two problems, a second magnetic head 238 is incorporated as part and parcel of the validation testing circuitry. As discussed earlier, a head 254 may be placed on the bottom plate 60 in juxtaposition with a compliant roller 85 so as to read or sense a portion of the bill which contains non-magnetic lines thereon. It has been found that with the vast majority of photo copy machines, these lines are reproduced during the copying process so as to have magnetic qualities; thus being readable by the head 254.

Further, the head 254 is preferably of a slightly different character than the head 202 such that the same is more sensitive to shock in that an oscillatory output is produced when a physical shock is imparted thereto. A head with such characteristics is easily developed and is most often characterized by looser core windings and a less securely bonded magnetic circuit than in the case of the more noise-resistant head 202. Suffice it to say that if a physical force is imparted to the tray 15 or if a photo copy of a bill is placed within the tray, the head 254 produces characteristic output oscillations. These signals are passed to a three-stage amplifier 240 which is identical to that discussed hereinabove comprising amplifiers 206, 216 and 220. The amplified output of the circuit 240 is applied to the one shot 242, the complimentary output of which is applied to the enabling input of the one shot 228. With this enabling input normally high, the outputs of the head 202 will be sensed by the one shot 228. The capacitor 244 tends to hold the enabling input of the one short 228 at a high level but, should the head 254 emit signals indicating that a substantial shock has been imparted to the system, the signals emitted from the complementary output of the one shot 242 will be sufficient to pull the enabling input of the one shot 228 to a low level and inhibit the same from sensing any further signals from the head 202. It should, of course, be readily appreciated that the capacitor 244 and resistor 246 are provided for time-delay purposes such that a minor shock resulting in only a few outputs from the one shot 242 will not disable the one shot 228. Only the high frequency output signals of the head 254 resulting from substantial shock will have the effect of inhibiting the one shot 228 and consequently the counter 234. Of course, appropriate selection of circuit values for the elements 244, 246 is necessary to determine the desired amount of shock wave time delay.

Referring again to the one shot 242, it can be seen that the true output thereof is applied to a counter 248. Thus, the outputs of the head 254 corresponding to either noise signals from physical shock or the magnetic discontinuities of a phony bill will be counted via the binary counter 248. The counter is decoded as at 250 so as to present an output when a particular number of oscillatory signals have been created via the head 254; indicating that either a phony document is being passed or that the tray 15 has been slammed with sufficient force to create intolerable oscillations at the head 254. In any event, the decoded output 250 is applied to the latch 252 to set the same and correspondingly reset the validity counter 234 and the latch 238. Hence, no accept signal can be passed to the sensing module and the tray will be returned with the bill. Further, as can be seen from the schematic, a resetting of the counters 234, 248 and the latches 238, 252 is affected when the tray is withdrawn or when the bill is accepted; all of this under control of appropriate logic circuitry heretofore known in the art.

Thus it can be seen that the circuitry of FIG. 10 is operative to sense the discontinuities on a valid bill or security and count the same. If a sufficient count is achieved, the bill is validated and appropriate change made. The circuitry further is operative through a second sensing network to determine the presence of a phony bill for which change is being sought. Lastly, the circuit is made sensitive to shock vibrations so as to inhibit the function of the validity detector or reject a bill if substantial physical force it imparted to the system.

Tray acceptor apparatus 10 has a pair of accept rollers which transfers the validated note to a storage department, not shown. The pair of accept rollers comprises top roller system generally indicated by the numeral 120 and bottom roller system generally indicated by the numeral 130. Both roller systems, of course, are so located so that upon the full insertion of tray 15 into housing 11, the back edge portion of the note resides between the rollers. Upon acceptance, a singal is set to motor 140, attached to either the top plate or the bottom plate, to activate either the top or the bottom roller system.

Considering top roller system 120, it contains a pair of main shafts 121 which are mounted on brackets 122 attached to top plate 70 in any conventional manner such as through a weld. The inner ends of main shafts 121 are connected to a cam 123 and resides in one portion thereof such as a side portion of a cylinder, as shown in FIG. 2. A roller shaft 124 is connected to an opposite side of the cylindrical cam and contains a series of rollers generally indicated by the numeral 125 which may be made of plastic as for example, nylon. As shown, rollers 125 have a shaft portion 126 and a wheel portion 127 with the latter having a recess 128 therein.

Similarly, bottom roller system 130 has a main shaft 131 which is mounted upon brackets 132 attached to bottom plate 60. In the embodiment depicted, bottom main shaft 131 has a drive gear 133 which matingly engages motor drive gear 141. Rollers, generally indicated by the numeral 135, have a shaft portion 136 and a wheel portion 137. As with the top wheels, the bottom roller wheels have a recess 138 except that preferably a resilient protection such as plastic or rubber rings 138 reside within the recess. Both top rollers 125 and bottom rollers 135 may be pressed on top shaft 126 and bottom shaft 136 respectively. However, bottom rollers 135 may rotate freely or slip about bottom main shaft 131 but be keyed together by two quarter cylindrical keys formed on each hub, not shown. However, the actual lengths of the hubs on each side of the wheel are not equal so that upon reversing the roller, the position of the roller wheel is changed. Of course, one of the keys may be attached to the shaft. In any event, the upper portion of the upper outer surface of O rings 139 are located in a plane substantially similar, if not identical to the plane of the note.

As best seen in FIG. 6, main shaft 121 of top roller system 120 has a cam lever 129 which may be actuated by movable ways 19 or side beam flange 41 of tray 15 upon insertion of tray 15 a fixed distance into housing 11. Due to roller shaft 124 being off-set from main shaft 121, a camming action of rollers 125 is effected which causes the rollers to move along in arc and contact the note causing it to bear against lower rollers 135. Due to the offset of roller shaft 124 from main shaft 121 and the length of lever arm 129, the camming action can be arranged so that rollers 125 contact the note at nearly the same velocity as the tray or note and in nearly the same direction as the plane of the note. This facet thus assures a smooth engagement of the top and bottom roller systems so that the accurate alignment of the note on the tray is not moved or distorted by engagement of the acceptance rollers. Since top roller wheel portion 127 is recessed at 128, the note is slightly crossed over the friction driving material or the O rings 129 of lower or bottom roller system 130. Such a provision makes the pinching forces between the upper and lower rollers less critical since a shear type engagement has been created. Moreover, the creased note provision stiffens the note thereby removing any wrinkles and permits the note to pass more readily out of the rollers. An additional and important aspect of the top and bottom roller systems, as best seen in FIG. 2, is that due to the offset of top roller shaft 124 from main shaft 120, it is located slightly in front of or towards tray 15 than the bottom rollers or bottom main shaft 121 so that rotation of the bottom drive rollers will tend to pull the top rollers into better contact under load. Thus, the structure with respect to top roller system 120 and bottom roller system 130 and the engagement therebetween not only provides a smooth contact or engagement with the note without causing any misalignment, pull or the like, but also insures a good frictional contact regardless of the condition of the note. Of course, although specific configurations of top rollers 125 and bottom rollers 136 have been described, other configurations may also exist which generally provide the same above-noted advantages.

Figure 5:
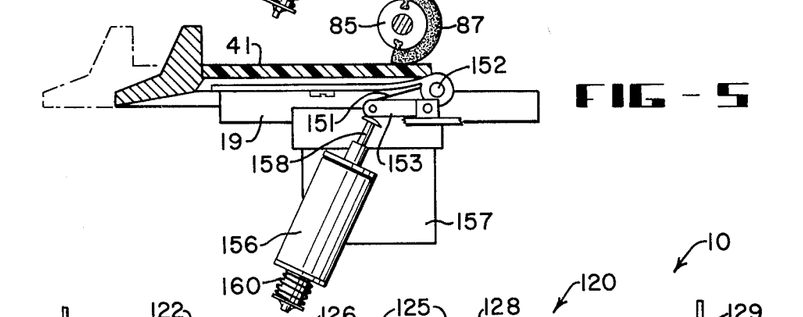
FIG. 5 is a partial sectional side elevation showing a solenoid engaging a locking member.

Tray apparatus 10 also contains a tray lock system, generally indicated by the numeral 150, which is so devised so that a minimum solenoid force is required to secure the tray. The lock system contains two arms, one arm 151 affixed to the tray in any conventional manner such as through pins 152 with the other arm 153 attached to the housing or the bottom plate in any conventional manner such as to pins 154. The length of the arm attached to the tray is slightly larger than the second arm attached to the bottom plate with pin 154 of the second arm being located at a point such that upon full insertion of tray 15 into housing 11, tray pin 152 is slightly further inward or behind pin 154 (FIG. 5). Such an arrangement causes the two arms to virtually overlap each other and bear against side beam 41 or tray note support 46. A solenoid 156 is attahced to the bottom plate as through flange 157 so that upon activation, solenoid arm 158 is caused to bear against the ends of arms 151 and 153 which are connected together through a pin 159. As previously noted, activation of the solenoid may readily be achieved through a proper timing sequence initiated as through a cam on drive shaft 82 or through any cams or recesses located on the tray itself. Since pins 152 and 154 are located very near each other and since solenoid arm 158 bears against the other ends of the arms, a large moment arm is developed so that a small solenoid force will offset a very large pull on the tray. Additionally, due to the setup, any attempt to pull the tray out results in the application of shear on pins 152 and 154. A small spring, 160 returns solenoid arm 158 back into the solenoid when the solenoid is released.

While in accordance with the patent statutes various preferred embodiments have been illustrated and described in detail, it is to be understood that the invention is not limited thereto, the scope of the invention being measured by the scope of the attached claims.

What is claimed is:

1. A tray acceptor apparatus, comprising,
   a housing, a tray mounted on said housing, and at least one auxiliary plate, said auxiliary plate mounted on said housing parallel to said tray,
   of said tray having a rack thereon, one of said plates having a drive shaft, said rack engaging said drive shaft,
   said drive shaft having a gear, said gear engaging said rack so that a mechanical engagement between said rack and said drive shaft is formed,
   said drive shaft having at least one compliant roller thereon, said compliant roller having a resilient covering thereon, and
   wherein the radius of the contact surface of said compliant roller with said tray is the same as the pitch radius of said gear so that said tray and said roller moves at the same speed.

2. A tray acceptor apparatus according to claim 1, wherein said drive shaft and said compliant roller is mounted on said auxiliary tray.

3. A tray acceptor apparatus according to claim 2, where said auxiliary tray is a top tray, and said compliant roller and said drive shaft are mounted on said top tray.

4. A tray acceptor apparatus comprising,
   a housing, a note tray for carrying a note mounted on said housing, a top plate and a bottom plate, said top plate and said bottom plate mounted on said housing parallel to said note tray,
   a magnetic sensing device, said sensing device mounted on said top plate or said bottom plate and in close relation to said note tray,
   said note tray having a rack thereon,
   a drive shaft, said drive shaft having a gear, said gear engaging said rack so that a mechanical engagement between said rack and said drive shaft is formed,
   said drive shaft having at least one compliant roller thereon,
   said drive shaft containing said compliant roller mounted on one of said plates and said magnetic sensing device mounted on the remaining plate,
   said magnetic sensing device having a magnetic head, said compliant roller located in close relationship to said magnetic head and contacting said note and forcing said note against said magnetic head.

5. A tray acceptor apparatus according to claim 4, wherein said compliant roller has a resilient covering so that the note is forced against said magnetic head.

6. A tray acceptor apparatus according to claim 5, wherein the radius of the contact surface of said compliant roller with said magnetic head is the same as the pitch radius of said gear so that said tray and said roller move at the same speed.

7. A tray acceptor apparatus according to claim 6, wherein said compliant roller is mounted on said top plate, and said magnetic sensing device is mounted on said bottom plate.

8. A tray acceptor apparatus according to claim 7, including a second magnetic sensing device and a second compliant roller, said magnetic sensing device is mounted on said bottom plate and said second compliant roller is mounted on said top plate, and
   said compliant roller located in close relationship to the note and to said second magnetic sensing device.

9. A tray acceptor apparatus comprising,
   a housing, a tray for carrying a note, said tray mounted on said housing, a top plate and a bottom plate, said plates mounted on said housing parallel to said tray,
   a top roller system, said top roller system having at least a roller, said roller mounted on a roller shaft,
   a main shaft, said roller shaft camming from said main shaft,
   a bottom roller system, said bottom roller system having at least a roller, said bottom roller mounted on a shaft, and said top roller system camming towards said bottom roller system and securing said note.

10. A tray acceptor apparatus according to claim 9, wherein said top roller has a recess and said bottom roller has a projection, and said top roller recess cams into said bottom roller projection.

11. A tray acceptor apparatus according to claim 10, wherein said bottom roller is mounted on said bottom plate and said top roller is mounted on said top plate.

12. A tray acceptor apparatus according to claim 11, wherein said bottom rollers have a recess, "O" rings located in said recess and forming said projection.

13. A tray acceptor apparatus comprising, a housing, a tray mounted on said housing, a tray lock system, said tray lock system including a solenoid having an arm, a first arm, said first arm connected to said tray guide, and a second arm, said second arm connected to said housing closure of said tray, effecting activation of said solenoid and causing said solenoid arm to bear against said first arm or said second arm, and wherein said second arm is longer than said first arm.

14. A tray acceptor apparatus according to claim 13, wherein said second arm is larger than said first arm.

15. A tray acceptor apparatus, comprising, a housing, a tray mounted on said housing, and at least one auxiliary plate, said auxiliary plate mounted on said housing parallel to said tray, which further includes:

first magnetic reading means connected to said auxiliary plate and in juxtaposition to said tray for sensing first magnetic discontinuities in paper placed in said tray, said first magnetic reading means produces output signals indicative of the number of first magnetic discontinuities sensed;

a. first counting means connected to said first magnetic reading means for counting the electrical output signals and producing an indication when a predetermined number of such output signals have been counted;

b. second magnetic reading means fixed in juxtaposition to said tray for sensing the presence of second magnetic discontinuities in papers placed in said tray, said second magnetic reading means producing output signals indicative of the number of second magnetic discontinuities sensed; and c. means connected to said second magnetic reading means for inhibiting said first counting means during a period in which magnetic discontinuities are sensed by said second magnetic reading means.

16. A tray acceptor apparatus according to claim 15 which further includes second counting means receiving and counting the outputs of the second magnetic reading means.

17. A tray acceptor apparatus according to claim 16 which further includes resetting means connected to and resetting said first counting means when said second counting means has counted a preselected number of output signals from the second magnetic reading means.

18. A tray acceptor apparatus according to claim 17 wherein said first and second magnetic reading means respectively comprise relatively tightly and loosely wound magnetic heads.

19. A tray acceptor apparatus according to claim 15 wherein said means for inhibiting said first counting means comprises an RC time delay circuit interconnected between said first and second counting means.

20. A tray acceptor apparatus according to claim 16 wherein said first and second counting means comprise binary counters.

* * * * *